United States Patent [19]

Payne

[11] 3,917,988

[45] Nov. 4, 1975

[54] SELECTIVELY VARIABLE TIMING MEANS FOR A BRUSHLESS ELECTRIC MOTOR

[75] Inventor: James U. Payne, Beatrice, Nebr.

[73] Assignee: Magna Motor, Inc., Barnes, Kans.

[22] Filed: Aug. 7, 1974

[21] Appl. No.: 495,266

[52] U.S. Cl. ............... 318/138; 318/254; 350/96 B
[51] Int. Cl.² ........................................ H02K 29/00
[58] Field of Search .......... 318/138, 254, 685, 696; 350/96 B

[56] References Cited
UNITED STATES PATENTS

| | | | |
|---|---|---|---|
| 3,023,348 | 2/1962 | Cox | 318/138 |
| 3,327,584 | 6/1967 | Kissinger | 350/96 B |
| 3,353,076 | 11/1967 | Haines | 318/254 X |
| 3,354,319 | 11/1967 | Loewen et al. | 350/96 B |
| 3,577,053 | 5/1971 | McGee | 318/254 |
| 3,581,173 | 5/1971 | Hood | 318/254 |
| 3,609,493 | 9/1971 | Rakes | 318/254 |

Primary Examiner—G. Z. Rubinson
Attorney, Agent, or Firm—Lowe, Kokjer, Kircher, Wharton & Bowman

[57] ABSTRACT

Method and apparatus for adjustably timing control circuitry in a brushless electric motor. The motor comprises a plurality of permanent magnets symmetrically aligned and disposed within its rotor, and a plurality of stationary electromagnets positioned near the periphery of the rotor which comprise the stator. A circular continuous timing band is concentrically located on the rotor and consists of a plurality of triangular-shaped portions of non-reflective material which are separated and spaced by alternating strips of reflective material. An incandescent bulb illuminates the band, and light pulses reflected therefrom are transmitted to a photosensitive transducer, which in turn triggers associated stator current control circuitry to produce rotary motion. A fiber optic conductor is positioned above the timing band to sample reflected light pulses and deliver same to the photo sensitive transducer. By adjusting the fiber optic pick-off point, the light pulses can e advanced, retarded, or varied in width, so that timing of the motor can be selectively optimized.

4 Claims, 6 Drawing Figures

SELECTIVELY VARIABLE TIMING MEANS FOR A BRUSHLESS ELECTRIC MOTOR

BACKGROUND AND SUMMARY OF THE INVENTION

This invention relates to brushless electric motors and more particularly to the timing of such devices.

Rotor windings in conventional DC motors must be commutated in order to insure proper electromagnetic polarity for motion to occur. This is normally accomplished by switching the polarity of the voltage delivered to the rotor windings by the use of brushes which contact an associated commutator. The disadvantages in such a system, such as brush wear-out, arcing, and radio frequency interference are well known, and in part to overcome such deficiencies brushless electric motors were developed.

Brushless electric motors typically utilize a rotor on which a plurality of permanent magnets are mounted in concentric alignment. Stationary electromagnets, which are located symmetrically around the rotor periphery, comprise the motor stator. When electric current is supplied to the stator electromagnets, movement of the rotor will occur, but in order to sustain rotary motion the supply current to the stator must be controllably varied. Thus various stator current control arrangements have been developed which affect "timing" of the motor.

For example, in U.S. Pat. No. 3,159,777 issued to E. W. Manteuffel, stator current control circuitry is triggered by "Hall Effect" electric currents generated in metal plates located in close proximity to the rotor magnets. In Levison, U.S. Pat. No. 3,546,546, currents induced in a timing sensor coil in response to movement of the nearby rotor magnets trigger a timing circuit to control stator current. Finally, timing may be accomplished through the utilization of magnetic reed switches in order to appropriately interrupt stator current passing therethrough when rotor magnets activate same.

It is a fundamental object of the subject invention to provide a simple and inexpensive timing apparatus for the stator current control circuitry in a brushless electric motor.

In the subject device a symmetrical circular "timing band" is formed from triangular nonreflective strips which are separated and spaced from each other by portions of light reflective material. An incandescent light bulb illuminates the timing band, and light reflected therefrom activates a photosensitive transducer. When the rotor is rotating the reflected light will consist of a series of pulses which will variably trigger the photosensitive transducer, thereby activating associated stator current control circuitry at appropriate instants.

In order to advance or retard the timing of prior art devices the position of the timing element in relation to the rotor magnets must be varied. When multiple timing elements are used precise and careful realignment is necessary in order to maintain symmetry. In "Hall Effect" timing devices alignment is extremely critical because a slight departure from a position normal to the incident magnetic field will result in a reduced output voltage. Where magnetic reed relays are used care must be taken to insure that a sufficient magnetic field is available to trigger the device in the advanced or retarded position. In any case the element must be securely refastened in each of its operating positions.

Accordingly, it is a primary object of the subject invention to provide in a brushless electric motor a stator current timing means which may be quickly and easily adjusted without critical alignment difficulties. One end of a fiber optic conductor is variably positioned over the aforementioned timing band. As this end is moved with the direction of rotor rotation the motor timing will be retarded, while if it is moved against the direction of rotation the motor will be advanced. The output of the photosensitive transducer triggers a transistor circuit which provides sufficient amplification to accommodate slight variations in the reflected light intensity as picked up by the fiber optic conductor.

It is a further object of the present invention to provide a means whereby the trigger pulse width in a brushless electric motor may be easily varied without the necessity of adjusting interior electronic control circuitry. When the aforementioned fiber optic pick-off is moved toward the center of the rotor the pulse width will increase, since the effective length of reflecting material between the nonreflecting triangles will become larger as the inner circumference of the timing band is approached. While the pulse width in the present device may also be varied by adjustment of electronic circuit components, as in the prior art, the pulse width adjustment means as set forth above adds significant versatility to the system. For example, if such a pulse width adjustment system were to employ a spring biased linkage system, it would be particularly amenable to centrifugal speed regulation.

Similarly, it is a further object of the present invention to provide a brushless motor timing system which is particularly amenable to automatic pulse retardation during the critical starting interval. Conversely, means for sensing rotor speed can be coupled to the timing means described to advance same automatically to maintain high efficiency at increasing speeds.

Other and further objects of the invention, together with the features of novelty appurtenant thereto, will appear in the course of the following description of the drawings.

DESCRIPTION OF THE DRAWINGS

In the accompanying drawings which form a part of the specification and are to be read in conjunction therewith, and in which like reference numerals are employed to indicate like parts in the various views:

With reference to FIG. 1 there is shown a brushless electric motor which is characteristic of such motors found in the prior art and well known to those skilled in this field. The motor 10 has a rotor 11 on which a plurality of permanent magnets 12 are symmetrically mounted. When a magnet passes an adjacently located magnetic reed switch 15 (as the rotor 11 rotates) the attraction of the magnetic field will cause the breaker points 15a in the reed switch to make contact. Current supplied by a battery 14 will thus flow through the electromagnet 13 thereby generating a magnetic field. With the connection as shown, pole 16 of the electromagnet 13 will be a "north" pole so that the permanent magnet 12 on the rotor which will be opposite the electromagnet at this time will be repelled. Reed switch 15 will open when no longer subject to a magnetic field and the timing cycle will be repeated. Diode 17 minimizes arcing in reed switch 15 during this turn off time. During the interval when reed switch 15 is open the magnets 12 will be attracted to the soft iron core 13a of the then unenergized electromagnet 13. More sophisticated devices pass current through the electromagnet in the opposite direction during this interval to create a "south" pole at 16 thereby increasing attraction and maximizing torque.

Figure 1:
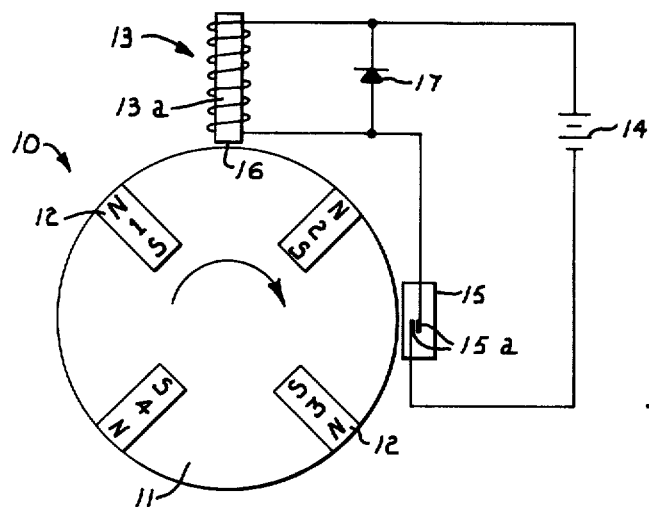
FIG. 1 is a schematic view of a conventional brushless electric motor in which a magnetic reed switch is utilized to effect stator current control.
Figure 2:
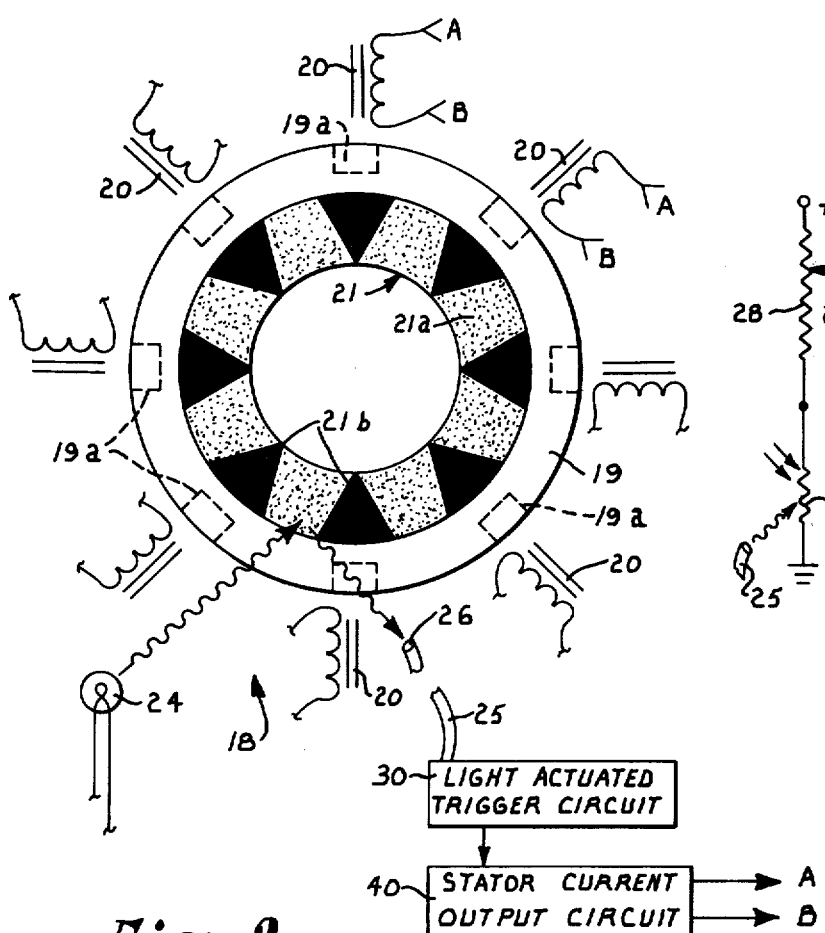
FIG. 2 is a diagrammatic illustration of a brushless electric motor showing a timing means constructed in accordance with a preferred embodiment of the invention.

With respect to the present invention and with particular reference first to FIG. 2, a brushless electric motor is shown having an improved timing system, generally indicated by the reference numeral 18, which generates a series of light pulses to actuate a trigger circuit 30. The trigger circuit in turn actuates a stator circuit 40 to thereby energize the motor's stator coils. Trigger circuit 30 and stator circuit 40 together comprise the stator control. As discussed in conjunction with FIG. 1, the resultant magnetic interaction between the stator coils and a plurality of rotor-mounted, permanent magnets produces rotational motion.

The motor rotor 19 has a plurality of permanent magnets 19a symmetrically disposed therewithin. The magnets 19a are preferably located as near as possible to the outer edge of the rotor. The motor stator is comprised of a plurality of electromagnets 20 which are symmetrically and fixedly mounted to the motor frame near the periphery of the rotor 19. Each of the electromagnets are connected in parallel to the outputs of stator current output circuit 40. Upon appropriately timed energization of the stator electromagnets 20, magnetic interaction with rotor magnets 19a will cause the rotor 19 to rotate. Timing system 18 insures that the stator electromagnets will be energized only during appropriate time intervals.

The timing system 18 includes a circular, doughnut shaped timing band 21 located on the rotor and which generates a continuous series of reflected light pulses in response to rotor rotation. In the illustrated embodiment the timing band 21 comprises a circular, doughnut shaped portion 21a made of light reflective material and a plurality of nonreflective, triangular-shaped segments 21b which are separated and spaced from each other in symmetric alignment on the reflective portion 21a. The triangular portions 21b are preferably constructed from black lacquer or plastic and are oriented with an apex of each triangle directed toward the center of the rotor 19.

An incandescent light bulb 24 is appropriately positioned near the rotor to direct light toward the timing band 21. As the rotor rotates, light impinging on the timing band will be intermittently reflected from the reflective portion 21a between the nonreflective triangular portions 21b. During the interval when light impinges upon the nonreflective portions 21b no light will be reflected. Thus a continuous series of light pulses are generated by the timing band as the rotor rotates.

The light pulses are delivered to trigger circuit 30 via a fiber optic conductor 25. Conductor 25 has a "pick off" end 26 which is adjustably positioned by conventional mounting means (not shown) sufficiently close to the timing band to receive the light pulses reflected therefrom. It is important to note that the width of the light pulses detected and transmitted by conductor 25 can be varied by moving conductor end 26 toward or away from the rotor center, since the effective width of the light reflective material will be varied. Also, the timing pulses may be advanced or retarded by similarly moving end 26 clockwise or counterclockwise with respect to the rotor center. The latter features are important, for example, when it is desirable to adjust motor speed or torque.

It should be obvious to one skilled in the art that the aforementioned timing system would be equally functional if the timing band were placed on the bottom of the rotor or on the rotor side. Furthermore, it will be equally apparent that a timing band consisting of light reflecting triangular portions spaced by nonreflective material could be substituted for the arrangement discussed above.

Figure 3:
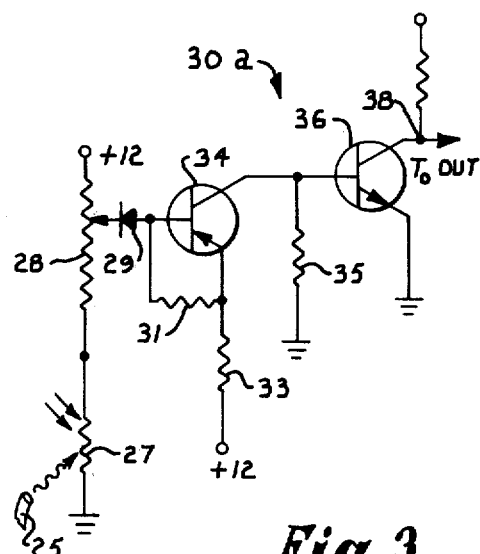
FIG. 3 is a schematic diagram of a light actuated trigger circuit.

A light actuated trigger circuit generally indicated by the reference numeral 30a, is shown in FIG. 3. Circuit 30a has a light sensitive resistor 27 which receives light pulses from fiber optic conductor 25. Resistor 27 is connected to one end of a potentiometer 28. The center tap of potentiometer 28 is connected via diode 29 to the base of a transistor 34. Depending upon the setting of potentiometer 28, transistor 34 will normally be biased off due to the connection of resistor 31 between its base and emitter. However when light impinges upon photosensitive resistor 27 the resistance of same decreases, and the resultant increase of current through the loop comprised of resistors 27, 28, 31 and 33, and diode 29 will cause transistor 34 to become forward biased. The resultant turn-on of transistor 34 will produce an output across resistor 35 which will turn on transistor 36, and a negative going trigger pulse will consequently be developed at node 38. Potentiometer 28 may be adjusted to accommodate varying circuit parameters, or it may be adjusted to prevent transistor 34 from turning on at all.

Figure 4:
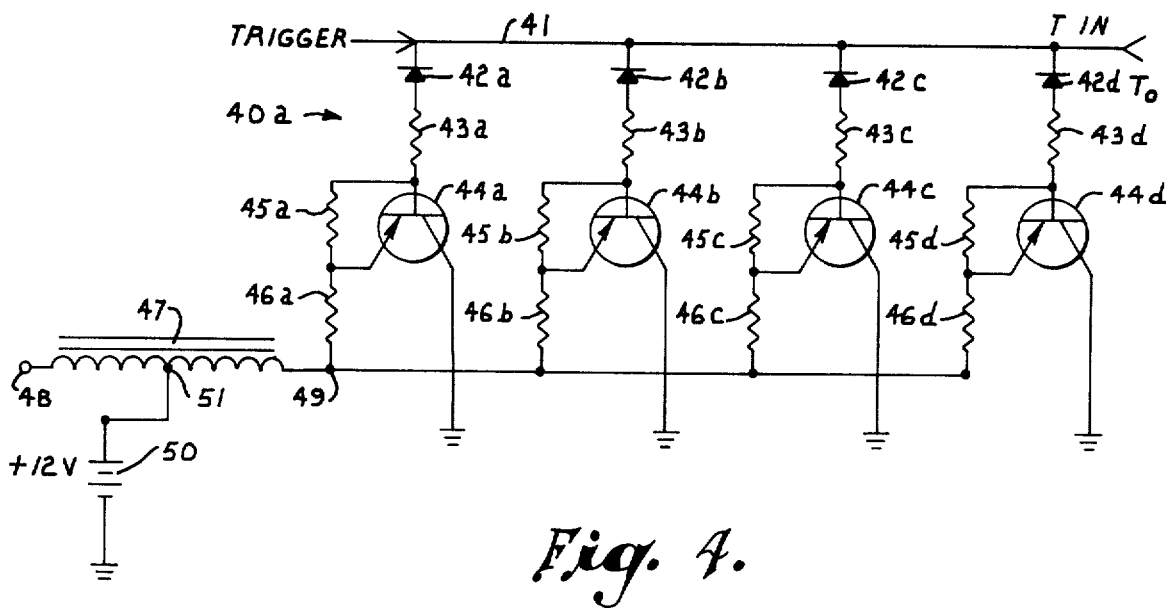
FIG. 4 is a schematic diagram of a stator current output circuit.

The negative going trigger pulses outputted by trigger circuit 30a are delivered to line 41 in a stator current output circuit 40a (FIG. 4). Circuit 40a comprises a plurality of preferably silicon power transistors 44a–44d which are similarly wired in parallel. The parallel connection minimizes the series impedance of the control circuitry so that maximum power can be delivered to the stator 47. Transistors 44a–44b are normally biased off by the connection of resistors 45a–45d respectively between the base and emitter of each transistor. Negative trigger pulses appearing on line 41 reach the transistor bases via diodes 42a–42d and resistors 43a–43d, thereby causing the transistors 44a–44d to turn on. With the turn-on of the power transistors the stator electromagnet 47 will be energized by the resultant flow of current from battery 50 through resistors 46a–46d and the power transistors 44a–44d.

In the preferred embodiment resistors 46a–46d, which connect the power transistor emitters with stator node 49, have an extremely small electrical resistance of approximately one tenth of an ohm. The function of these resistors is to protect the power transistors from inadvertent overload. The diodes 42a–42d isolate each of the transistors 44a–44d respectively from transients and/or short circuits which may develop in adjacent transistors.

Connected to the output of the stator current control circuit 40a, the stator electromagnet 47 actually comprises a plurality of electromagnets connected in parallel which are symmetrically disposed on the motor frame adjacent the rotor 19, such as the electromagnets 21 connected in parallel and shown in FIG. 2. During the critical timing intervals the stator electromagnets will cooperate with the permanent magnets attached to the motor rotor to produce the magnetic forces which cause rotary motion.

The stator electromagnet 47 includes a center tap winding 51 which is coupled to a conventional voltage source 50. The magnetic field polarity of stator electromagnet 47 may be reversed during an appropriate interval to increase motor torque or speed by connecting another stator current control circuit to stator node 48 to energize the opposite half of the electromagnet. The additional stator circuit would then be appropriately triggered (by another trigger source) during the interval when circuit 40a is "off". When this is done for example, the rotor magnets 19a (FIG. 2) will first be attracted and then repelled from the stator electromagnets 20.

Figure 5:
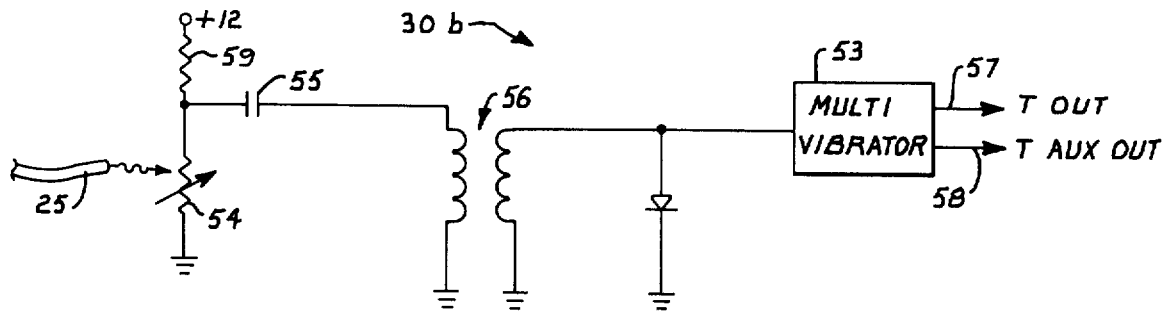
FIG. 5 is a schematic diagram of an alternative embodiment of a trigger circuit.
Figure 6:
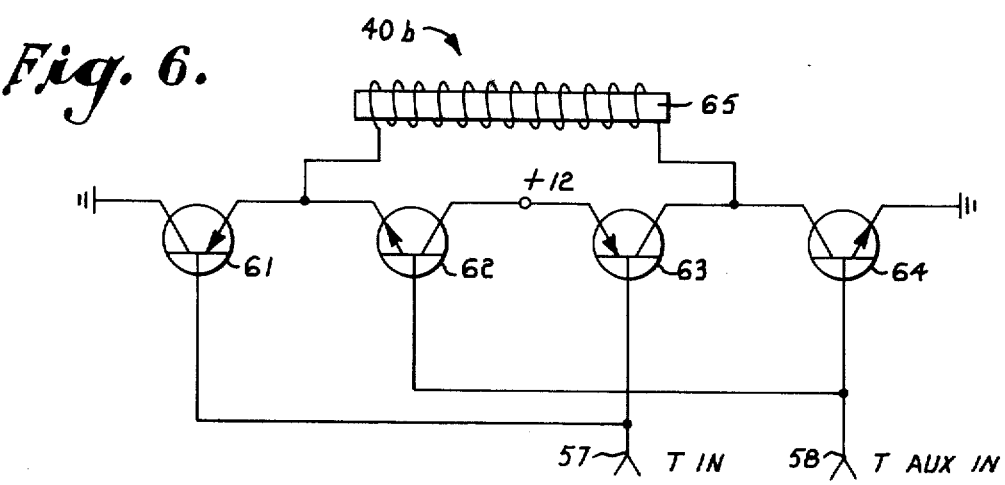
FIG. 6 is a schematic diagram of an alternative embodiment of a stator current output circuit.

An alternative means for reversing the magnetic polarity of the stator coils is shown in FIGS. 5 and 6. Trigger circuit 30b (FIG. 5) develops a square wave trigger output in multivibrator 53 from light pulses which are delivered to a photosensitive resistor 54 via fiber optic conductor 25. In operation capacitor 55 will charge to a voltage level determined by resistors 54 and 59. When light impinges upon light sensitive resistor 54 its resistance will drop so that capacitor 55 will accordingly discharge through resistor 54 and transformer 56. The pulse thereby developed across the secondary winding of transformer 56 will fire multivibrator 53, producing a negative going trigger pulse on line 57. An additional trigger pulse of opposite polarity and delayed phase is outputted on line 58.

The trigger pulses produced by circuit 30b are utilized to trigger stator current control circuit 40b (FIG. 6). Circuit 40b is operable to reverse the polarity of the stator electromagnets, and the stator windings need not be center tapped. When a negative going pulse appears on line 57, power transistors 61 and 63 will be turned on and transistors 62 and 64 will be biased off. Current will then flow through electromagnet 65, which corresponds to electromagnets 21 (FIG. 2) connected in parallel. When a positive pulse subsequently appears on line 58, transistors 62 and 64 will be switched on and transistors 61 and 63 will be switched off. At this time current will flow through electromagnet 65 in the opposite direction so that magnetic polarity will be reversed.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:

1. A brushless electric motor comprising:

a rotor;

a plurality of permanent magnets symmetrically disposed on said rotor;

a stator comprising a plurality of electromagnets connected in parallel and concentrically located around said rotor;

a light source for producing a light beam directed toward said rotor;

a circular timing band associated with said rotor for intermittently reflecting said light beam to generate a series of light pulses in response to rotation of said rotor, said timing band comprising a plurality of light reflective strips uniform in size and symmetrically disposed on said rotor and separated by nonreflective material, said reflective strips having a circumferential width which varies according to the radial distance from the center of said rotor;

a fiber optic conductor with an input end and an output end for transmission of light pulses therethrough, said input end adjustably positionable both radially outward from and angularly about the center of said timing band;

photosensitive means adjacent the output end of said conductor for receiving said light pulses; and stator control means connected to said photosensitive means for simultaneously energizing said electromagnets in response to said light pulses.

2. The combination as in claim 1 wherein said stator control means comprises:

means for generating trigger pulses in response to said light pulses; and stator current output means for supplying electric current simultaneously to said electromagnets in response to said trigger pulses.

3. A method of timing a brushless electric motor having a rotor with permanent magnets disposed therewithin and a stator having a plurality of electromagnets connected in parallel, said method comprising the steps of:

generating a series of reflected light pulses in response to rotation of said rotor by shining a light beam on a rotor mounted, circular timing band comprised of a plurality of light reflective strips uniform in size and symmetrically arranged and separated by nonreflective material, said reflective strips having a circumferential width which varies according to the radial distance from the center of said rotor;

transmitting said light pulses through a fiber optic conductor having an output end connected to a photosensitive element and an input end adjustably positionable both radially outward from and angularly about the center of said timing band; and energizing said stator by applying electric current simultaneously to said electromagnets in response to said light pulses.

4. The method as in claim 3 wherein said stator energizing step comprises the further steps of:

generating trigger pulses in response to said light pulses, and delivering electric current simultaneously to said electromagnets in response to said trigger pulses.

* * * * *